United States Patent [19]

Murano

[11] Patent Number: 4,818,462
[45] Date of Patent: Apr. 4, 1989

[54] METHOD AND APPARATUS OF INJECTION MOLDING FRONT GRILL PANELS OF ROOM AIR CONDITIONER UNITS AND THE LIKE

[75] Inventor: Mitsuo Murano, Fujinomiya, Japan

[73] Assignee: Kabushiki Kaisha Toshiba, Kawasaki, Japan

[21] Appl. No.: 63,838

[22] Filed: Jun. 19, 1987

[30] Foreign Application Priority Data

Jun. 26, 1986 [JP] Japan ................................. 61-150515

[51] Int. Cl.$^4$ ............................................. B29C 45/27
[52] U.S. Cl. .............................. 264/328.8; 264/297.2; 425/542; 425/572; 425/588
[58] Field of Search ............... 264/328.1, 328.8, 328.9, 264/328.11, 328.12, 318, 161, 297.2; 425/542, 567, 572, 588

[56] References Cited

U.S. PATENT DOCUMENTS

| | | | |
|---|---|---|---|
| 2,799,435 | 7/1957 | Abplanalp | 264/328.8 |
| 4,269,802 | 5/1981 | Linne | 264/328.1 |
| 4,500,332 | 2/1985 | Gillingham | 55/443 |

Primary Examiner—Jan H. Silbaugh
Assistant Examiner—Jill L. Heitbrink
Attorney, Agent, or Firm—Foley & Lardner, Schwartz, Jeffery, Schwaab, Mack, Blumenthal & Evans

[57] ABSTRACT

The front panel of an air conditioner unit or the like, including a louver-like intake grill comprising several transverse slats with outward-upward inclination is formed by injecting molten resin into cavities formed between a stationary mold and a movable mold along a parting line thereof, the molten resin being thus injected through pin-point gates formed on the stationary mold side and tab gates constituting parts of respective cavities and provided on the stationary mold side at part corresponding to the upper edge faces of the slats, the pin-point gates being connected to the upstream parts of the tab gates. By this method and apparatus a high feed rate of the resin is obtainable, and the molding time is shortened without impairment of the aesthetic appearance of the front panel due to unsightly cut marks left by the trimming of the residual sprue resin remaining in the pin-point gates.

5 Claims, 1 Drawing Sheet

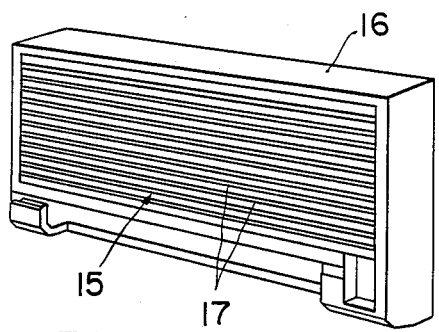
FIG. 1
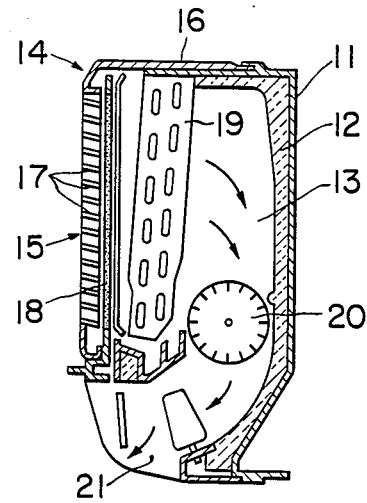
FIG. 2
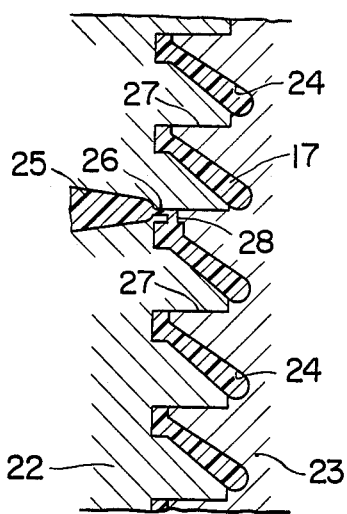
FIG. 3
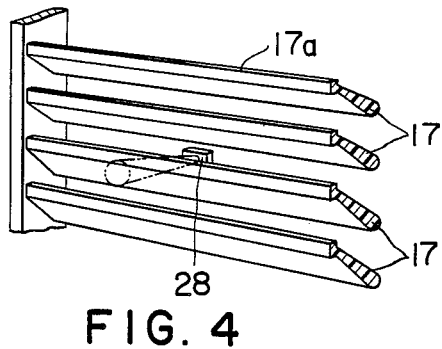
FIG. 4
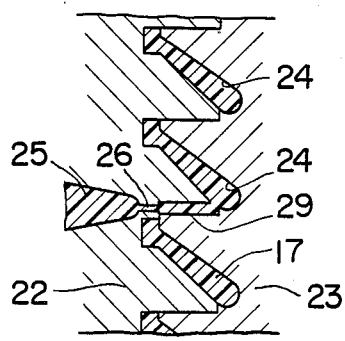
FIG. 5
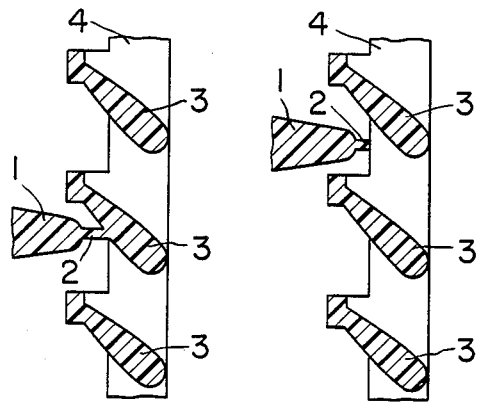
FIG. 6 PRIOR ART
FIG. 7 PRIOR ART

METHOD AND APPARATUS OF INJECTION MOLDING FRONT GRILL PANELS OF ROOM AIR CONDITIONER UNITS AND THE LIKE

BACKGROUND OF THE INVENTION

This invention relates generally to methods of forming front panels of room air conditioner units and the like and more particularly to a method of molding front panels provided with louver-like air intake grills each formed by a large number of transverse slats inclined with outward-upward slope.

In general, a room air conditioner unit operates to draw thereinto room air through an air intake grill formed in a front panel of the unit, to cause the air thus drawn in to pass through a heat exchanger within the unit and thus be cooled, and to discharge the cooled air into the room interior. A widely used air intake grill of an air conditioner unit of this type has a louver-like structure comprising a large number of transverse or horizontal slats disposed parallelly at specific spacing intervals. A typical method of fabricating this intake grill is to form the intake grill integrally with the front panel by injection molding a plastics material such as a polystyrene resin or an acrylonitrile-butadiene-styrene (ABS) resin.

In this case, the pin-point gates for injecting the molten resin into the mold cavities are positioned on the back face sides of the transverse grill slats. For this reason, the runners, constituting passageways for the resin within the mold, are ordinarily installed so as to direct the resin to the rear side through gaps between adjacent transverse slats. In such as case wherein the transverse slats are horizontal, it is possible to install the pin-point gates on the back faces of the slats, but, in the case where the transverse slats are inclined with upward slope, the spacing in the vertical direction between the front edge and the rear edge respectively of each pair of adjacent slats becomes very small. For this reason, it becomes difficult to provide the runners between the slats and to install the pin-point gates on the rear edge side of the slats.

Accordingly, in the conventional injection molding process, pin-point gates communicating with runners are installed at a plurality of positions within the mold corresponding to suitable positions on the front faces of the transverse slats or uprights or vertical members supporting and joined to the slats, as will be briefly described again hereinafter. The sprue resin material remaining in these pin-point gates after molding is cut off and removed by means of a trimming tool such as a trimming knife or a trimming nipper cutter.

Since the pin-point gates in a conventional mold are installed in this manner on the front face side of the front panel, cut marks due to the trimming of the surplus resin in these pin-point gates are left on the front exterior face of the front panel and, being unsightly, impair the aesthetic appearance of the front panel. As a consequence, the quality and commercial value of the product is lowered. Furthermore, if the diameter of the pin-point gates is reduced in order to reduce as much as possible the unsightliness of these cut marks, the injection flow of the molten resin will become poor, with the consequence that the required molding time will increase, and the process will become unsuitable for quantity production.

In order to solve these problems, it has been the practice heretofore to mold the intake grill and the supporting frame separately. In this method, a pair of film gates for forming injection inlets for the molten resin are provided on both sides of the intake grill, and the surplus resin remaining in these film gates after molding is trimmed off and removed. In the practice of this conventional method, however, it becomes necessary to use a plurality of molds, and the production cost rises. At the same time, the work of trimming and removing the film gates is difficult.

SUMMARY OF THE INVENTION

Accordingly, it is an object of this invention to provide a method of molding front panels of air conditioner units and the like, by which method the feed flow of resin is improved and the time required for molding is shortened without impairment of the aesthetic appearance of the front panels due to cut marks left on the front face of the transverse slats of the intake grill by the trimming of the resin remaining in pin-point gates.

According to this invention there is provided a method of molding a front panel with an air intake grill comprising a louver-like structure of several slats with outward-upward inclination, which method comprises injecting molten resin into cavities formed between a stationary half mold and a movable half mold along a parting line thereof and is characterized in that the molten resin is thus injected into said cavities through pin-point gates formed on the stationary half mold side and tab gates constituting parts of respective cavities and provided on the stationary half mold side at parts corresponding to the upper edge faces of the transverse slats, said pin-point gates being connected to the side faces on the stationary half mold side of the tab gates.

By the method of this invention, unsightly cut marks due to trimming and removal of superfluous resin remaining in the pin-point gates are not left, whereby the aesthetic exterior appearance of the front panel is not impaired. Furthermore, since it is also possible to use pin-point gates with large inlets, the injection of the molten resin can be completed in a short time.

The nature, utiity, and further features of this invention will be more clearly apparent from the following detailed description when read in conjunction with the accompanying drawings, briefly described below.

BRIEF DESCRIPTION OF THE DRAWINGS

In the drawings:

FIG. 1 is a perspective view of the front, top, and a side of an air conditioner unit provided with a front panel molded in accordance with the method of this invention;

FIG. 2 is side elevation, in vertical section, showing the essential internal parts of the air conditioner unit shown in FIG. 1;

FIG. 3 is a relatively enlarged fragmentary side elevation, in vertical section, indicating the state of injection of resin into a mold in the molding method according to the invention;

FIG. 4 is a perspective view showing a part of a front panel after it has been removed from a mold;

FIG. 5 is a side elevation similar to FIG. 3 indicating another embodiment of the invention;

FIGS. 6 and 7 are fragmentary side elevations, partly in vertical section, showing positions of pin-point gates according to conventional injection molding methods.

DETAILED DESCRIPTION OF THE INVENTION

As conducive to a full understanding of this invention, a certain disadvantageous feature of a conventional method of fabricating a front panel with a louver-like intake grill as mentioned briefly hereinbefore will first be briefly described with reference to FIGS. 6 and 7. As shown, pin-point gates 2 connected to the downstream ends of runners 1 are installed at a plurality of locations within a mold corresponding to suitable positions on the front faces of the transverse slats 3 or upright support members 4. As mentioned hereinbefore, the surplus resin remaining in these pin-point gates 2 after the molding step is cut off by means of a trimming tool such as a trimming knife or nipping pliers, leaving unsightly cut marks, which are thus left on the front exterior face of the front panel since the pin-point gates in a conventional mold are installed in the mold on the side corresponding to the front face side of the front panel. As a consequence, the numerous difficulties arise as was described hereinbefore.

Referring now to FIGS. 1 and 2, the construction of a front panel to be molded by the method of this invention for an air conditioner unit will be described.

This air conditioner unit is housed within a cabinet 11, the inner wall surfaces of which are lined by a heat insulation material 12. The cabinet 11 is essentially of the shape of a box with front panel 14 constituting a portion of the front wall of the cabinet 11 and comprising a louver-like air intake grill or register 15 and a frame 16 molded integrally. The intake grill 15 comprises several horizontal or transverse slats 17, which are parallel and horizontally disposed at uniform space intervals in the form of a louver and are inclined with a forward-upward slope.

A filter device 18 of flat shape is disposed within the cabinet 11 on the inner side or to the rear of the intake grill. A heat exchanger 19 is mounted in the cabinet 11 to the rear of the filter device 18. An air passage 13 is formed between the rear side of the heat exchanger 19 and the inner surface of the rear wall of the cabinet 11. An air fan 20 is provided at a lower part of the air passage 13 and operates to draw warm air into the cabinet 11 through the air intake grill 15, the filter device 18, and the heat exchanger 19, then to dra the air which has been thus cooled in the heat exchanger 19 through the air passage 13, and finally to discharge this cooled air out of the cabinet 11 through a discharge outlet 21 at a bottom part thereof.

The above described front panel 14 is molded by the method of this invention as now described with respect to a preferred embodiment of the invention and with reference to FIGS. 3, 4, and 5.

As shown in FIG. 3, polystyrene resin or ABS resin is injected through runners 25 and pin-point gates 26 into cavities 24 formed between a stationary half mold 22 and a movable half mold 23. The cavities 24 are adapted to form the aforedescribed large number of transverse slats 17 with specific forward-upward slope of an air intake grill 15, for example, and are formed between the stationary mold 22 and the movable mold 23 when these mold halves are assembled along their parting line 27. This parting line 27 has a saw-tooth shape and is constituted by connecting lines consecutively joining the front edges and the rear edges of the transverse slats 17.

For the purpose of injecting molten resin into cavities 24, a suitable number of tab gates 28 are formed in the mold at parts corresponding to the upper edge surfaces 17a of the transverse slats 17, and pin-point gates 26 are connected to the front faces or upstream parts of these tab gates 28. In communication with these pin-point gates 26, runners 25 are provided on the side of the stationary mold 22, and molten resin is simultaneously introduced through a plurality of runners 25, the pin-point gates 26, and the tab gates 28 into the cavities 24. Although FIG. 4 shows only one tab gate 28, for all practical purposes, a reasonable number of pin-point gates and tab gates are formed at suitable distances in the mold on the upper edge surfaces 17a of the transverse slats 17.

After the mold injection step, the movable mold 23 is pulled apart from the stationary mold 22 along the parting line 27, whereupon the molded article is drawn away from the stationary mold 22 while being held on the side of the movable mold 23. At this time, the pin-point gates 26 are severed and removed. The molded article thus held in the movable mold 23 is separated therefrom by being pushed out by means of an ejection bar (not shown in the drawings). Thereafter superfluous projections formed by the tab gates 28 are trimmed off by means of a trimming tool such as nipper pliers.

While this invention has been described above with respect to one embodiment thereof, it will be obvious that the invention can be practiced with numerous modifications. For example, in the above described example, each tab gate 28 is provided above the upper edge surface 17a of a transverse slat 17, but according to the invention, a connective span could extend between the upper edge part of one of the cavities for forming adjacent transverse slats and the lower edge parts of the other cavity as shown in FIG. 5, illustrating another embodiment of the invention.

What is claimed is:

1. In a method of injection molding a louvered article having numerous transverse parallel slats of outward-upward inclinations, including injecting molten resin into cavities formed between a stationary half mold and a movable half mold, along a parting line thereof, the molten resin being injected into said cavities through pin-point gates formed on the stationary half mold side and tab gates also formed on the stationary half mold side, each pin-point gate communicating with a mold cavity through an associated tab gate, said tab gates positioned on the mold at positions corresponding to the upper edge faces of the transverse slats, said pin-point gates being connected to the side faces of the tab gates.

2. In a method of injection molding a louvered article according to claim 1, in which each of said tab gates is so formed on the stationary half mold side as to be disposed at a position corresponding to one part of the upper edge face of a transverse slat.

3. In a method of injection molding a louvered article according to claim 1, each said tab gate connecting the upper edge face of one of the cavities for forming adjacent transverse slats and the lower edge face of the adjacent cavity.

4. An injection molding apparatus for a louvered article having a plurality of transverse slats with parallel outward-upward inclinations, comprising:
 a fixed mold half;
 a moveable mold half;

cavities in said mold halves to form said slats when said mold halves are closed one against the other;
pin-point injection gates provided in the stationary mold half;
tab gates provided in the stationary mold half, said tab gates located on the stationary mold half at positions corresponding to the upper edge faces of the transverse slats and constituting part of the respective cavities;
said pin-point gates communicatively connected to the side faces of said tab gates;
and means for injecting molten resin into said cavities through said pin-point gates and respectively communicating tab gates.

5. The apparatus of claim 4 in which each of the tab gates is communicatively connected between the part of one cavity forming the upper edge face of one slat and the part of the adjacent cavity forming the lower edge face of another slat.

* * * * *